(12) United States Patent  (10) Patent No.: US 8,922,660 B2
Yamagata  (45) Date of Patent: Dec. 30, 2014

(54) IMAGE PICKUP APPARATUS WITH SYNCHRONIZATION PROCESSES

(75) Inventor: Kenji Yamagata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 391 days.

(21) Appl. No.: 13/352,217

(22) Filed: Jan. 17, 2012

(65) Prior Publication Data

US 2012/0182428 A1  Jul. 19, 2012

(30) Foreign Application Priority Data

Jan. 18, 2011  (JP) ................................ 2011-007590

(51) Int. Cl.
  *H04N 5/33*  (2006.01)
  *H04N 5/225*  (2006.01)
  *H04N 13/02*  (2006.01)
  *H04N 5/232*  (2006.01)

(52) U.S. Cl.
  CPC ......... *H04N 5/2251* (2013.01); *H04N 13/0296* (2013.01); *H04N 13/0239* (2013.01); *H04N 5/23245* (2013.01)
  USPC ....................................................... 348/164

(58) Field of Classification Search
  CPC . H04N 5/2251; H04N 5/247; H04N 13/0296; H04N 13/0239; H04N 5/23245; H04N 5/232; H04N 5/222; H04N 13/0057; H04N 13/0055; H04N 13/0459; H04N 13/0497; G03B 17/00; G03B 15/02
  USPC ....................................................... 348/164
  See application file for complete search history.

(56) References Cited

U.S. PATENT DOCUMENTS

| 4,429,328 | A | * | 1/1984 | Jones et al. ..................... 348/47 |
| 4,528,587 | A | * | 7/1985 | Jones, Jr. ......................... 348/44 |
| 4,567,513 | A | * | 1/1986 | Imsand ........................... 348/55 |
| 4,734,756 | A | * | 3/1988 | Butterfield et al. ............ 348/43 |
| 4,862,873 | A | * | 9/1989 | Yajima et al. ................... 348/45 |
| 4,999,713 | A | * | 3/1991 | Ueno et al. ................ 348/240.3 |
| 5,119,189 | A | * | 6/1992 | Iwamoto et al. ............... 348/47 |
| 5,142,642 | A | * | 8/1992 | Sudo ............................... 348/47 |
| 5,175,616 | A | * | 12/1992 | Milgram et al. ............... 348/47 |
| 5,687,400 | A |  | 11/1997 | Ishiguro |
| 5,835,264 | A | * | 11/1998 | Tandler et al. ............... 359/377 |

(Continued)

FOREIGN PATENT DOCUMENTS

CN  101409786 A  4/2009
JP  2000-089095 A  3/2000

(Continued)

*Primary Examiner* — Jay Patel
*Assistant Examiner* — Francis G Geroleo
(74) *Attorney, Agent, or Firm* — Canon USA Inc. IP Division

(57) ABSTRACT

An image pickup apparatus includes a light emitting unit and a light receiving unit, a first light path changing unit, and a second light path changing unit, wherein the first light path changing unit is movable from a first state, in which a light flux from the light emitting unit is guided toward a front direction of the image pickup apparatus, into a second state in which a light flux from the light emitting unit is guided toward a front direction and a side direction of the image pickup apparatus, and wherein the second light path changing unit is movable from a first state, in which a light flux from a front direction of the image pickup apparatus is guided to the light receiving unit, into a second state in which light fluxes from a front direction and a side direction.

10 Claims, 11 Drawing Sheets

(56) References Cited

U.S. PATENT DOCUMENTS

| | | | |
|---|---|---|---|
| 5,886,816 A * | 3/1999 | Faris | 359/464 |
| 5,949,477 A * | 9/1999 | Hoglin | 348/47 |
| 6,139,490 A * | 10/2000 | Breidenthal et al. | 348/45 |
| 6,414,708 B1 * | 7/2002 | Carmeli et al. | 348/42 |
| 6,507,359 B1 * | 1/2003 | Muramoto et al. | 348/47 |
| 6,701,081 B1 * | 3/2004 | Dwyer et al. | 396/329 |
| 6,862,140 B2 * | 3/2005 | Ogino | 359/473 |
| 8,016,747 B2 * | 9/2011 | Sawachi | 348/45 |
| 8,243,123 B1 * | 8/2012 | Geshwind et al. | 348/42 |
| 2002/0009137 A1 * | 1/2002 | Nelson et al. | 375/240.1 |
| 2003/0052966 A1 * | 3/2003 | Trinkel et al. | 348/47 |
| 2008/0303910 A1 | 12/2008 | Nishida | |
| 2009/0034952 A1 | 2/2009 | Clark | |
| 2009/0128635 A1 | 5/2009 | Baek | |
| 2012/0242805 A1 * | 9/2012 | Tyou | 348/47 |

FOREIGN PATENT DOCUMENTS

| | | |
|---|---|---|
| JP | 2006-197406 A | 7/2006 |
| JP | 2006-345168 A | 12/2006 |
| JP | 2010-056768 A | 3/2010 |
| JP | 2010-136158 A | 6/2010 |
| JP | 2011-007881 A | 1/2011 |

\* cited by examiner

IMAGE PICKUP APPARATUS WITH SYNCHRONIZATION PROCESSES

BACKGROUND OF THE INVENTION

1. Field of the Invention

The present invention relates to an image pickup apparatus including a light receiving unit and a light emitting unit.

2. Description of the Related Art

Recently, a three-dimensional (3D) television has been released for home use and interest in a 3D video picture has been growing. The 3D image is produced by shooting an object with two image pickup apparatuses which are arranged side-by side, and utilizing the parallax of these shot images. At this time, in order to shoot a 3D image which does not give uncomfortable feeling to users, it is necessary to shoot the moving image while synchronizing shutters between two image pickup apparatuses. Therefore, conventionally, two mage pickup apparatuses are connected with a cable and shooting is performed while sending a synchronization signal from one apparatus to another. However, when the connection is made by the cable, an operation of attaching/detaching the cable is very complicated and gives heavy burden to workers. Therefore, to improve operability, it is conceivable to connect two image pickup apparatuses using optical communication, which does not need the cable connection operation.

On the other hand, a recent image pickup apparatus has employed a light emitting unit for projecting auxiliary light to an object in order to obtain a bright picture even in a dark place. Further, in order to remotely control an image pickup apparatus, the image pickup apparatus may have a remote control system. This system is generally operated using optical communication, and has a light receiving unit in the image pickup apparatus side. Further, to protect elements in both the light emitting unit and the light receiving unit, Japanese Patent Application Laid-Open No. 2000-89095 discusses a technique in which front faces of these units are covered with window members and this technique has been generally used.

However, The light emitting unit is provided to illuminate an object and the light receiving unit in the remote control system is provided to operate the image pickup apparatus from the distant position in a state in which a photographer is within an angle of view. Therefore, in the conventional image pickup apparatus, the light emitting unit and the light receiving unit are arranged to face only the front of the image pickup apparatus. From this configuration, the aforementioned light emitting unit and light receiving unit cannot be used as the communication unit in the state in which two image pickup apparatuses are arranged in parallel, so that the exclusive light emitting unit and light receiving unit need to be provided. This configuration is costly and not practical. Accordingly, in the image pickup apparatus using the conventional technique, it is required to connect between the image pickup apparatuses by a cable to send and receive a synchronization signal, so that the system has a structure which is very complicated to operate and not easily usable.

SUMMARY OF THE INVENTION

According to an aspect of the present invention, an image pickup apparatus includes a light emitting unit and a light receiving unit, wherein the light emitting unit and the light receiving unit are arranged in parallel and oriented toward a front direction of the image pickup apparatus to face an object, of which an image is to be picked up, a first light path changing unit, and a second light path changing unit, wherein the first light path changing unit is movable from a first state, in which a light flux from the light emitting unit is guided toward a front direction of the image pickup apparatus, into a second state in which a light flux from the light emitting unit is guided toward a front direction and a side direction of the image pickup apparatus, and wherein the second light path changing unit is movable from a first state, in which a light flux from a front direction of the image pickup apparatus is guided to the light receiving unit, into a second state in which light fluxes from a front direction and a side direction of the image pickup apparatus are guided to the light receiving unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Figure 1A:
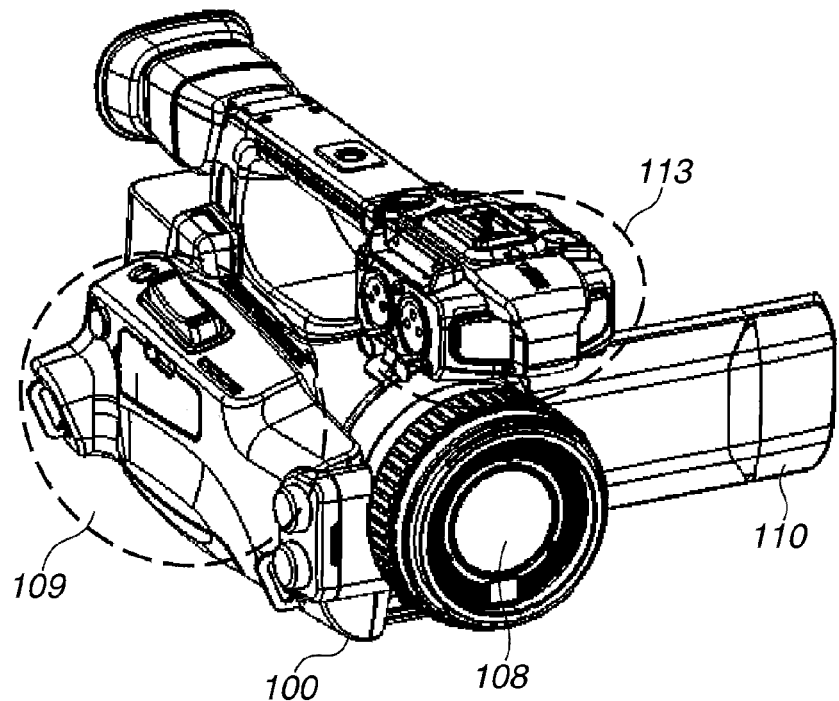
FIGS. 1A and 1B are perspective views from a forward right direction and backward left direction of a video camera according to the exemplary embodiment of the present invention.

Various exemplary embodiments, features, and aspects of the invention will be described in detail below with reference to the drawings.

A feature of the embodiments is that a first light path changing unit and a second light path changing unit are respectively provided in a light emitting unit and a light receiving unit which are arranged in parallel and oriented in a front direction. When an apparatus is in a normal mode, the first light path changing unit is in a first state which can guide a light flux coming from the light emitting unit, to the front direction of the apparatus. When the apparatus is in a synchronization shooting mode, the first light path changing unit is in a second state which can guide a light flux coming from the light emitting unit, to the front direction and the side direction of the apparatus.

When the apparatus is in the normal mode, the second light changing unit is in a first state which can guide a light flux from the front direction of the apparatus, to the light receiving unit. When the apparatus is in the synchronization shooting mode, the second light path changing unit is in a second state which can guide light fluxes from the front direction and the side direction of the apparatus, to the light receiving unit.

The light path changing unit is, typically, a coated mirror (e.g. a half-silvered mirror) which partially reflects light and partially transmits light to function as a light path dividing unit (or beam splitter unit). Such a coated mirror is hereinafter referred to as a half-mirror. However, as the light path changing unit, the following configuration can be adopted as an alternative to the half-mirror. For example, a plane-shaped member, in which liquid crystal is enclosed, is placed on a light path with a predetermined angle to a light axis of a light flux. An applied state of voltage (e.g., a direction of the voltage or a magnitude of the voltage) is controlled to change a transmission ratio and a reflection ratio of electromagnetic waves. With this configuration, it is possible to select the first state or the second state.

Further, in another alternative, a wave guide path such as an optical fiber, which guides the electromagnetic wave from the light emitting unit or to the light receiving unit, may be arranged to be let into or brought out from a light path so that the first state and the second state can be selected. As for the switching unit, a structure, in which the switching unit is manually moved and the light path changing unit is shifted in conjunction with the movement, will be described in the exemplary embodiment below. However, other structures can be used. For example, a structure is possible, in which switching is performed by a touch panel and the light path changing unit is electrically controlled according to the switching. As for an electromagnetic wave for optical communication, an electromagnetic wave in other wavelength range can be used other than IR as appropriate.

The exemplary embodiment of the present invention will be described based on the attached drawings below. The exemplary embodiment will be described, using a video camera as an example of the image pickup apparatus. In the present specification, directions of up, down, left, and right are set relative to a direction from a photographer toward an object, and an object side is defined as the front of an apparatus. First, the structure of a video camera in the present exemplary embodiment will be described with reference to FIG. 1.

Figure 1B:
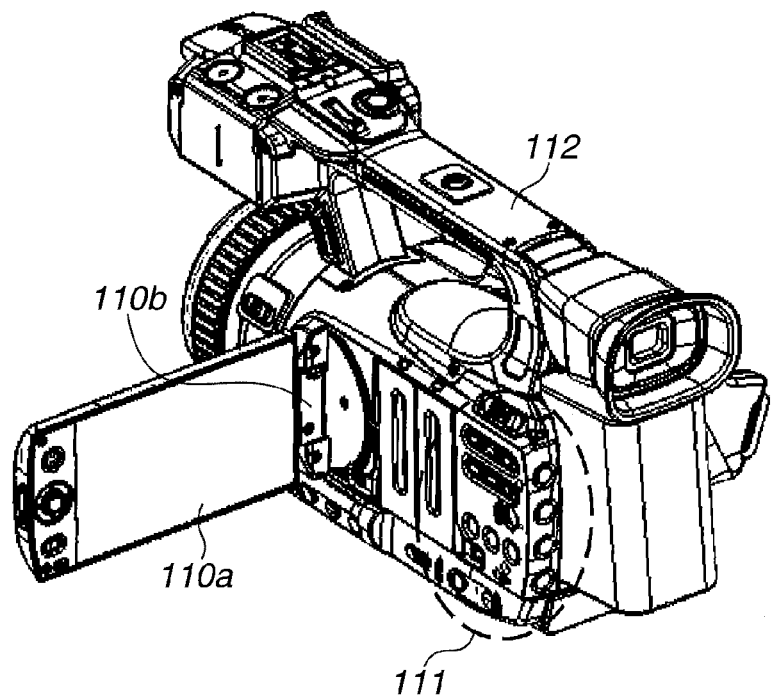

FIG. 1A is a perspective view of a video camera 100 according to the present exemplary embodiment as viewed from right forward side. FIG. 1B is a perspective view as viewed from left back side. As illustrated in FIG. 1, the video camera 100 according to the present exemplary embodiment includes an imaging unit 108, a grip unit 109, a display unit 110, an operation unit 111, a handle unit 112, and IR unit 113. Further, inside the video camera 100, there is a base plate (not illustrated). The imaging unit 108 includes a lens for imaging an object and a sensor for converting an imaged picture to an electric signal. The imaging unit 108 is arranged to face an object. By using the grip unit 109, a photographer grips the video camera 100.

The display unit 110 is an apparatus for displaying a shot image or an image during shooting. The operation unit 111 is configured with switches operated by a user when the user changes setting at a time of shooting. The display unit 110 is connected to the video camera 100 with a hinge 110b and a user can open or close the display unit 110 to bring the video camera 100 into an open state or a closed state. When the video camera 100 is in the open state as illustrated in FIG. 1, the user can confirm a screen 100a and operate the operation unit 111. The handle unit 112 is a portion gripped by a user when the user holds the video camera 100 at a low position and performs low-angle shooting. The IR unit 113 includes an IR light emitting unit 101 and an IR light receiving unit 102.

In the video camera 100 with the aforementioned configuration, the operability of the video camera 100 becomes better when a user grips the camera 100 with his dominant hand and operates at the same height of his eye. Thus, conventionally, it is desirable for the sake of usability that the grip unit 109 is located in the right side of the video camera 100. Further, since the display unit 110 and the operation unit 111 are used during shooting, it is proper that these units are located at a surface which is not covered by a photographer's hand during shooting. In other words, it is proper to set the location of these units at a left side face of the video camera 100 which is not covered by a hand when the photographer grips. Since the handle unit 112 is a portion gripped at a time of low angle shooting, it is desirable for the sake of usability to locate it in an upper side of the video camera 100.

Figure 2:
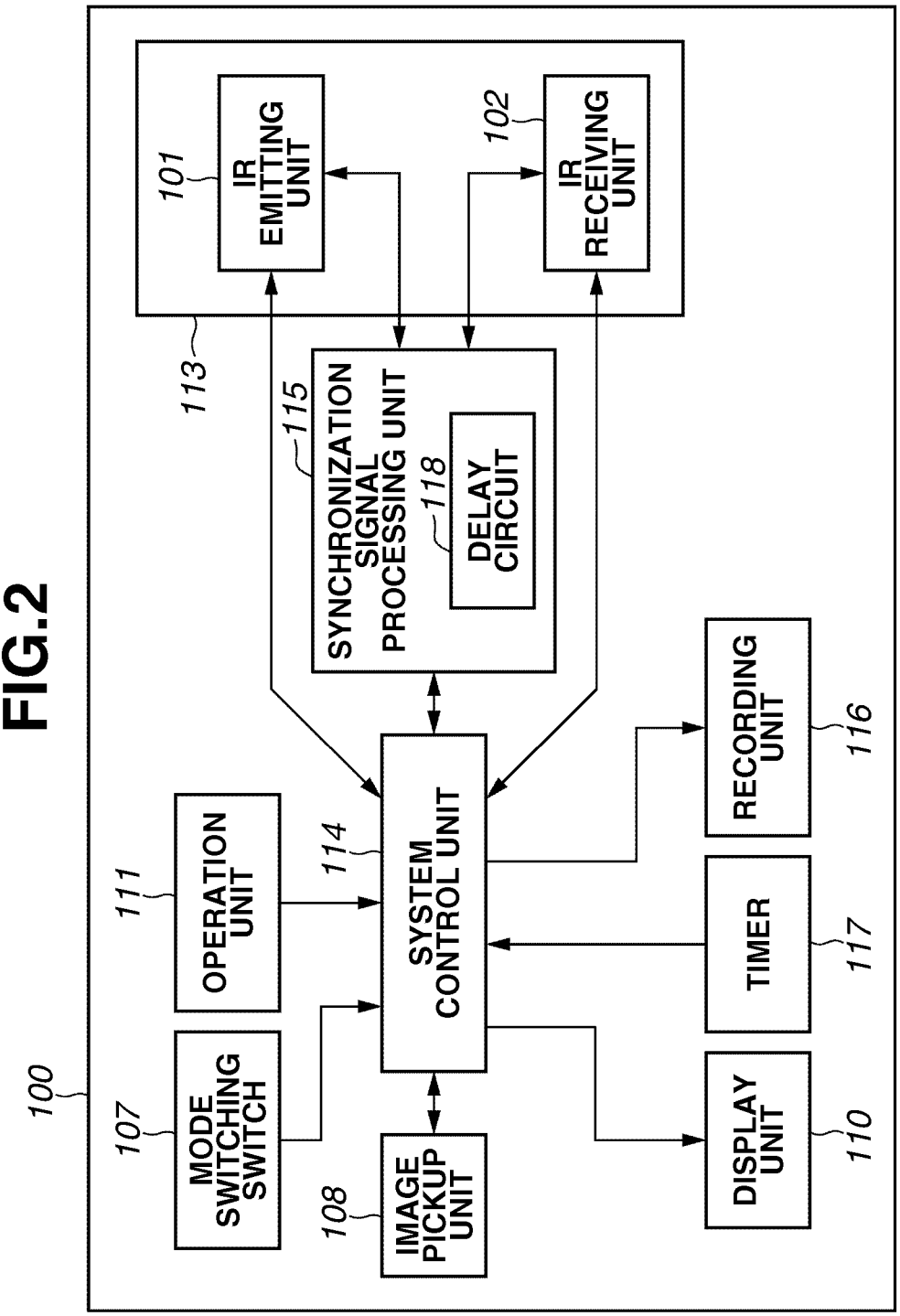
FIG. 2 is a block diagram illustrating a processing flow according to the exemplary embodiment of the present invention.

An inside configuration of the video camera 100 according to the present exemplary embodiment will be described with reference to FIG. 2. FIG. 2 is a block diagram illustrating a flow of the processing of the video camera 100 according to the present exemplary embodiment. On the base plate inside the video camera 100, a system control unit 114 which is a control unit, a synchronization signal processing unit 115 including a delay circuit 118, a recording unit 116, and a timer 117 are provided. The system control unit 114 controls an entirety of the video camera 100. The synchronization signal processing unit 115 is a control unit for controlling a synchronization signal for performing synchronization shooting. The recording unit 116 is a flash memory type recording medium. The timer 117 is a subtraction type counter including a quartz oscillator. The delay circuit 118 delays a synchronization signal. The detailed operation at a time of synchronization shooting will be described later.

Figure 3A:
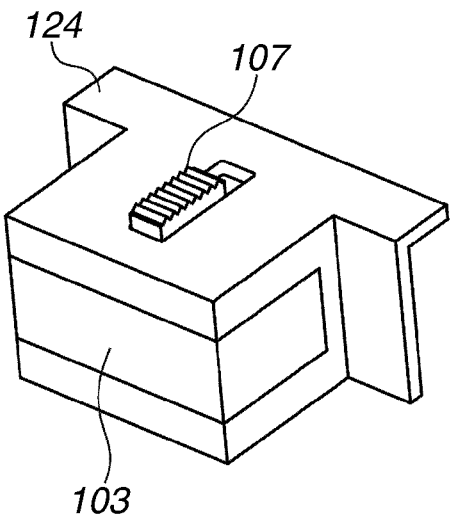
FIGS. 3A and 3B are perspective views of an infrared (IR) unit including a light path changing unit according to the exemplary embodiment of the present invention.
Figure 3B:
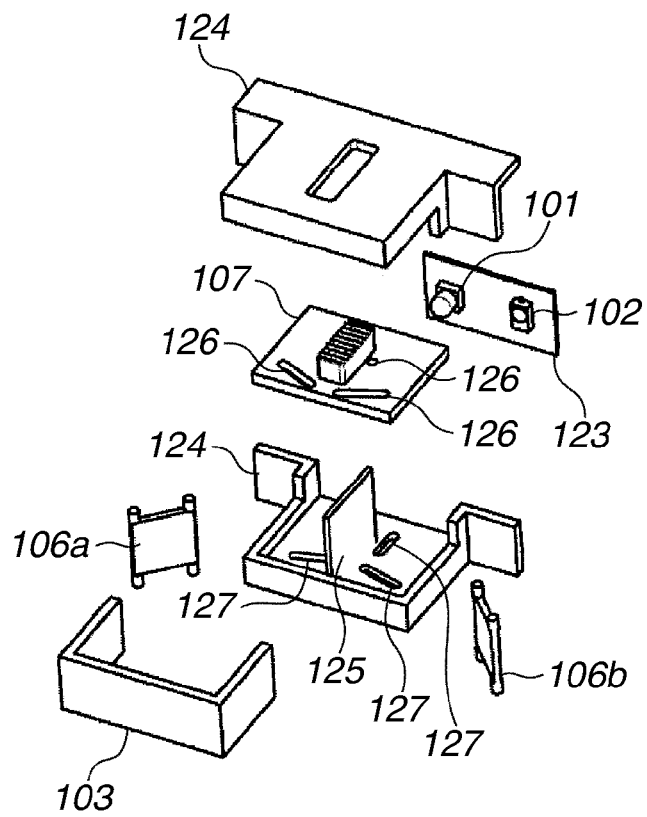
Figure 4A:
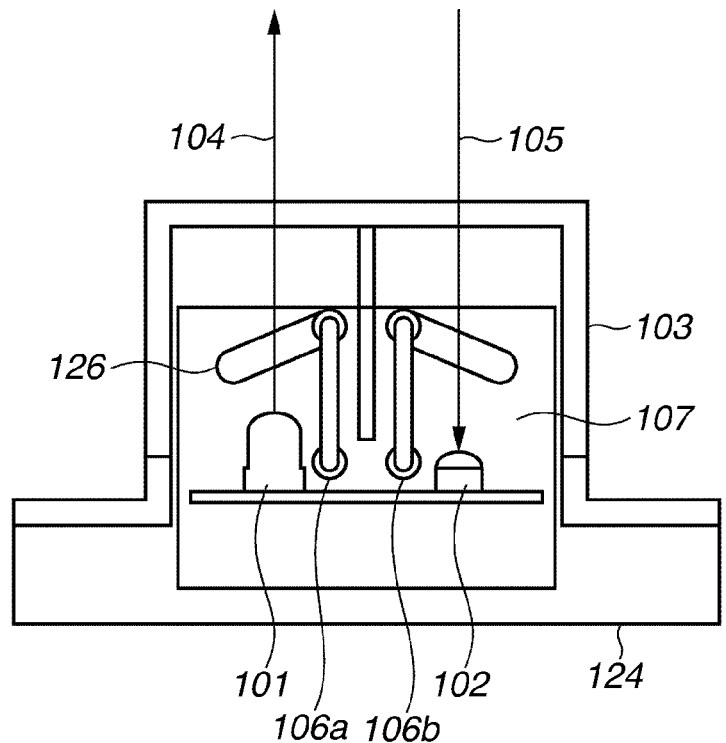
FIGS. 4A and 4B are cross-sectional views of the IR unit as viewed from the down side at each position.
Figure 4B:
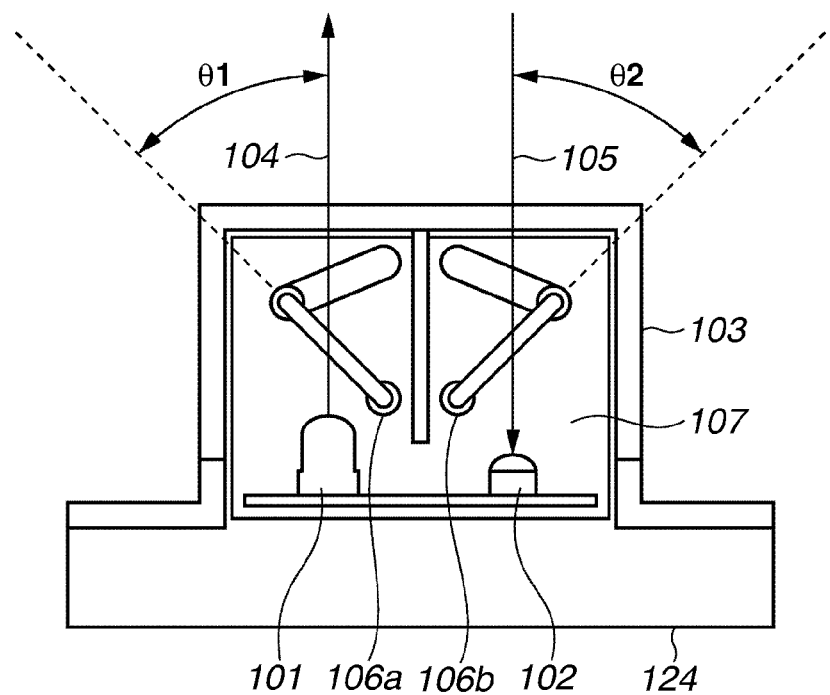
Figure 5A:
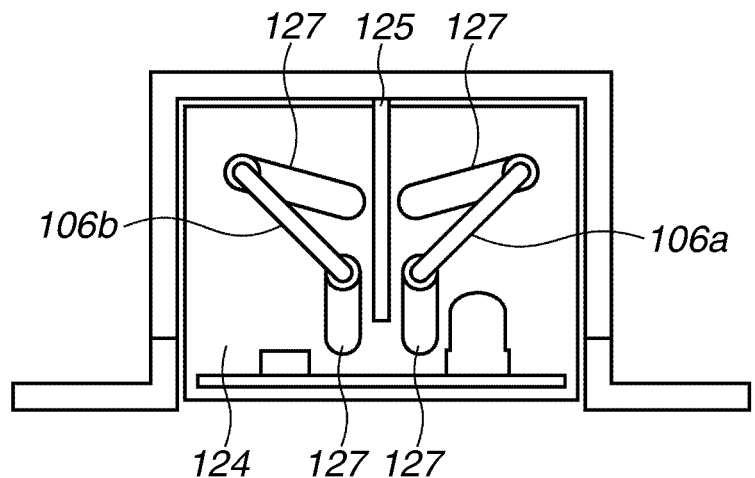
FIGS. 5A and 5B are cross-sectional views of the IR unit illustrating cam grooves.
Figure 5B:
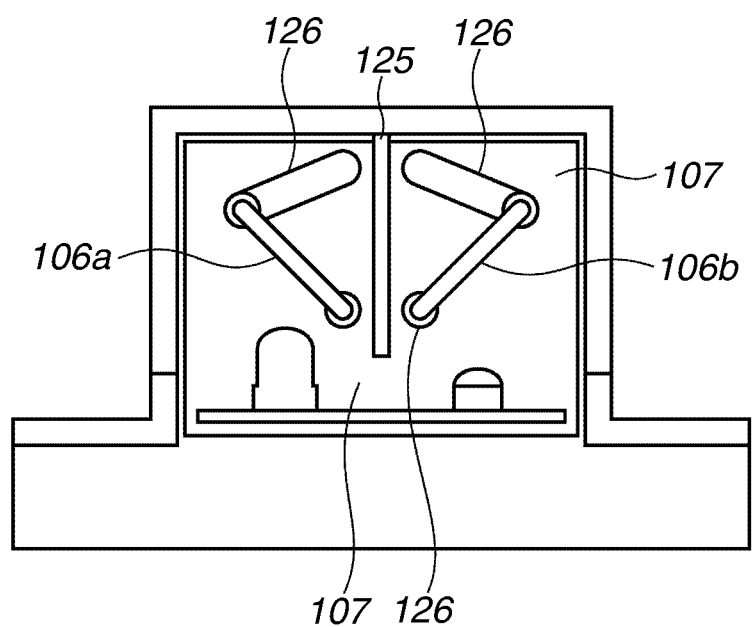
Figure 6A:
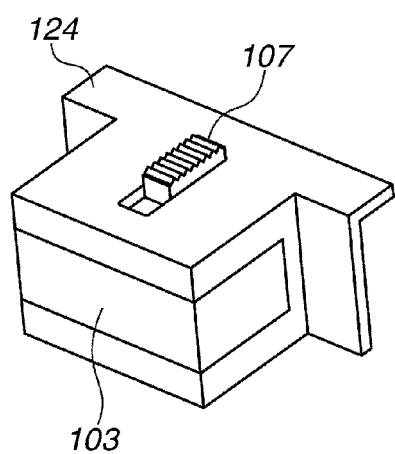
FIGS. 6A, 6B, 6C, and 6D illustrate IR units at each position.
Figure 6B:
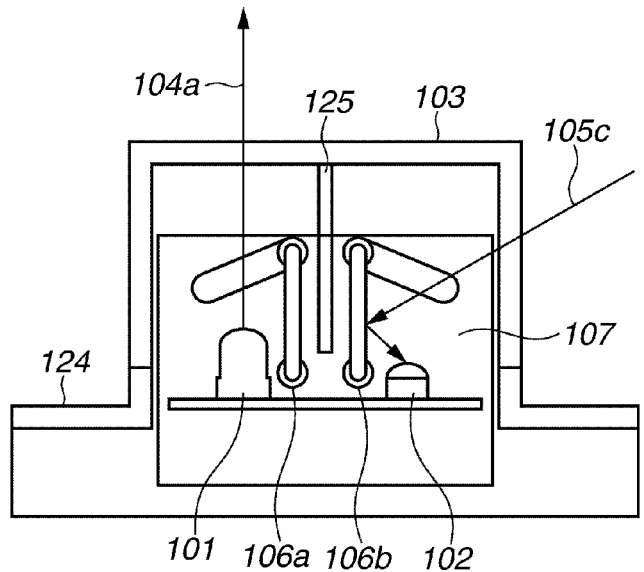
Figure 6C:
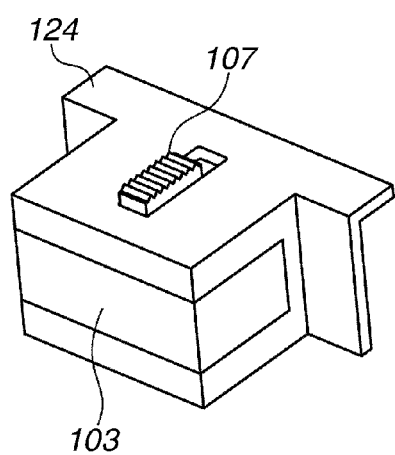
Figure 6D:
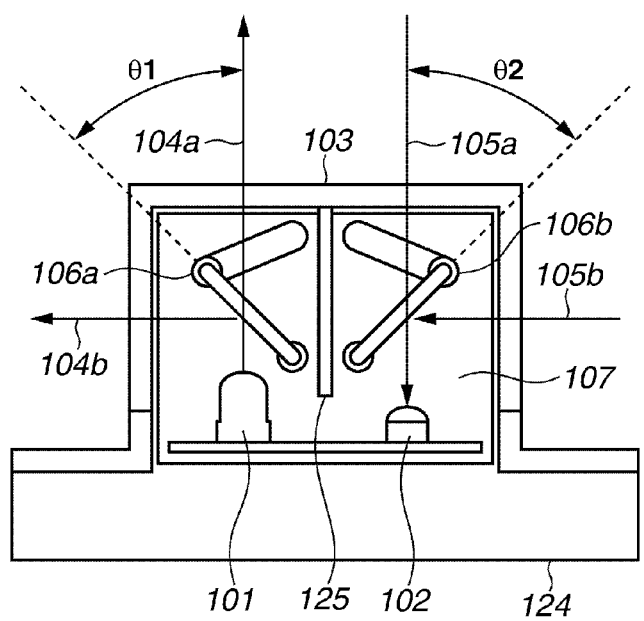

The IR unit 113 will be described in detail with reference to FIG. 3 to FIG. 6. FIG. 3 illustrates a schematic configuration of the IR unit 113 according to the present exemplary embodiment. FIG. 3A is a perspective view as seen from the front side and FIG. 3B is an exploded perspective view. FIG. 4A is a cross-sectional view of the IR unit 113 in a first position or state as viewed from a low side. FIG. 4B is a cross-sectional view of the IR unit 113 in a second position or second state as viewed from a low side. FIG. 5 illustrates cam grooves in the IR unit 113. FIG. 5A is a cross-sectional view of an inside of the IR unit 113 as viewed from an upper side. FIG. 5B is a cross-sectional view of an inside of the IR unit 113 as viewed from a lower side. FIG. 6A is a perspective view illustrating an outer appearance of the IR unit 113 in the first position. FIG. 6B is a cross-sectional view illustrating an inside of the IR unit in the first position as viewed from a lower side. FIG. 6C is a perspective view illustrating an outer appearance of the IR unit 113 in the second position. FIG. 6D is a cross-sectional view of an inside of the IR unit 113 in the second position as viewed from a lower side.

As illustrated in FIG. 3, the IR unit 113 according to the present exemplary embodiment includes an IR light emitting unit 101, an IR light receiving unit 102, a window member 103, half-mirrors 106a and 106b which are light path changing units, a mode change switch 107, an IR base plate 123, an outer surface member 124. The IR emitting unit 101 is a light emitting diode (LED) which can emit light with a wavelength in an infrared region. The IR light receiving unit 102 is a device which can receive light with a wavelength in an infrared range.

The window member 103 is made of a plastic resin with a property which blocks light in a visible light region and transmits only light in an infrared region. Further, the window member 103 is located at the front of a protruding (convex) portion provided in upper side of the imaging unit 108 including an imaging optical system. The half-mirrors 106a and 106b transmit a part of incident light and reflect the rest of the light. The transmittance and the reflectance of the half-mirror in an infrared range is about 50%. The mode change switch 107 switches a shooting mode between the normal mode and the synchronization shooting mode. A part of the mode change switch has a shape protruding from the outer surface member 124.

Both the IR light emitting unit 101 and the IR light receiving unit 102 are mounted on the IR base plate 123 and held in the IR unit 113 so as to take a position in which the light emitting surface and the light receiving surface face an object. At this time, the IR light emitting unit 101 is on the grip unit 109 side and the IR light receiving unit 102 is on the side opposite to the grip unit 109. These units (101 and 102) are arranged side by side. Further, on the IR base plate 123, a detection unit (not illustrated) for detecting a movement of the mode change switch 107 is also provided. A light shielding wall 125 is a rib-shaped part integrally formed with the outer surface member 124 and positioned (exists) between the IR light emitting unit 101 and the IR light receiving unit 102.

The video camera 100 according to the present exemplary embodiment has a low illuminance shooting mode. When the video camera 100 is in the low illuminance shooting mode, the IR light emitting unit 101 projects IR auxiliary light to an object and an IR removal filter included in the imaging unit 108 is retracted from a light path in the imaging unit 108. In the low illuminance mode, by performing the aforementioned control, the video camera 100 can shoot even in darkness, using the light of the IR light emitting unit 101 which is reflected from an object.

Further, the video camera 100 has a control function using a space optical transmission technology, which utilizes IR emitted from a remote control system. Thus, a photographer can control an operation of the video camera 100 even from a distant position. More specifically, the IR light receiving unit 102 receives IR emitted from the remote control system and the system control unit 114 controls an operation of the video camera 100 according to signal information indicated by the emitted IR.

The aforementioned IR auxiliary light illuminates an object and the remote control system operates from the distant position in a state that the photographer is within an angle of view. Therefore, the IR light emitting unit 101 and the IR light receiving unit 102 in the IR unit 113 need to be arranged to face an object. Further, if the paths of a light flux from the IR light emitting unit 101 and a light flux to the IR light receiving unit 102 are blocked, the functions of the both units cannot be carried out. Thus, the both units need to be located at a position not covered by a hand gripping the video camera 100.

Further, when the aforementioned IR auxiliary light is illuminated from the upper side of the imaging unit 108, a more natural picture can be taken than the picture taken when the IR auxiliary light is illuminated from the lower side of the imaging unit 108. Therefore, the IR light emitting unit 101 needs to be located at a higher position than the imaging unit 108. Accordingly, as illustrated in FIG. 1, it is optimal that the IR unit 113 is provided on the (maximum) front part of the handle unit 112.

Now, a detailed location of the half-mirrors 106a and 106b will be described with reference to FIG. 4. The half-mirrors 106a and 106b, which are the first and the second light path changing units, are provided in a position anterior to the IR light emitting unit 101 and the IR light receiving unit 102, as illustrated in FIG. 4. The half-mirror 106a can take two positions, i.e., a first position A and a second position B. In the first position A, the half-mirror 106a is completely retracted from the light flux 104 of the IR light emitting unit 101. In the second position B, the half-mirror 106a is positioned at a predetermined angle $\theta 1$ to the light axis of the light flux 104 from the IR light emitting unit 101.

The half-mirror 106b can take two positions, i.e., a first position A and a second position B. In the first position A, the half-mirror 106b is completely retracted from the light flux 105 of the IR light receiving unit 102. In the second position B, the half-mirror 106b is positioned at a predetermined angle $\theta 2$ relative to the light axis of the light flux 105 to the IR light receiving unit 102 from in front of the apparatus. At this time, the angle $\theta 1$ which the half-mirror 106a forms with the light flux 104, and the angle $\theta 2$ which the half-mirror 106b forms with the light flux 105, are approximately equal. The half-mirror 106a covers the light flux 104 coming from the IR light emitting unit 101 and the half-mirror 106b covers the light flux 105 going to the IR light receiving unit 102. That is, in the present exemplary embodiment, $\theta 1$ equals $\theta 2$ and is 45 degrees.

An operation mechanism of the half-mirrors 106a and 106b will be described with reference to FIG. 5 and FIG. 6. As illustrated in FIG. 5, the cam grooves 126 and 127 are respectively provided inside the mode changing switch 107 and inside the outer surface member 124. Protruding (convex) portions provided on the half-mirrors 106a and 106b are engaged with the cam grooves 126 and 127 respectively. Therefore, as illustrated in FIG. 6, the half-mirrors 106a and 106b can move between the first position and the second position, in conjunction with the movement of the mode change switch 107. At this time, when a photographer selects the normal shooting mode, the half-mirror 106 takes the first position. When the photographer selects the synchronization shooting mode, the half-mirror 106 takes the second position. The conjunction of the mode changing switch 107 and the half-mirrors 106a, 106b can be mechanically achieved or can be achieved according to the system control unit 114, 214.

Operations of light emitting and light receiving at each position will be described. First, the operations of light emitting and light receiving at the first position will be described with reference to FIGS. 6A and 6B. As illustrated in FIGS. 6A and 6B, when the half-mirrors 106a and 106b take the first position, the IR auxiliary light illuminating an object does not transmit through the half-mirror 106a, so that the video camera 100 can project the light without reducing light quantity. Further, at a time of receiving the light from a remote control system, even when the IR from the remote control system is incident on the side, the IR is reflected by the half-mirror 106b and can be incident on the IR light receiving unit 102. Of course, when the IR is incident on the front direction, the IR can be incident on the IR light receiving unit 102. Therefore, there is an advantage that the light receiving range from the remote control system becomes wide.

The operations of light emitting and light receiving at the second position will be described with reference to FIGS. 6C and 6D. When the half-mirrors 106a and 106b take the second position, the light flux 104 emitted from the IR light emitting unit 101 is divided into the light flux 104a which transmits through the front of the half-mirror 106a and the light flux 104b which reflects in a direction according to the inclination angle $\theta 1$ of the half-mirror 106a. Thus, it is possible to project two light fluxes to an outside of the video camera 100. Similarly, with respect to the light flux 105 received by the IR light receiving unit 102, the IR light receiving unit 102 can receive two light fluxes, i.e., the light flux 105a which transmits through the half-mirror 106b and is incident on the front, and the light flux 105b which reflects at an angle according to the inclination angle θ2 of the half-mirror 106b.

At this time, to emit and receive light of the two fluxes, the IR unit 113 should not block the light fluxes 104 and 105. In other words, the two light fluxes 104a and 104b coming from the IR light emitting unit 101 and the two light fluxes 105a and 105b going to the IR light receiving unit 102 need to transmit through the window member 103. Therefore, the window member 103 has a shape not only covering the front of the IR unit 113 but also extending (coming) around up to the side wall.

Further, if the light projected from the IR light emitting unit 101 is reflected inside the IR unit 113 and is incident on the IR light receiving unit 102, incorrect detection is made. Therefore, a light blocking wall 125 prevents the light projected from the IR light emitting unit 101, from being reflected inside the IR unit 113 and being incident on the IR light receiving unit 102, and prevents the incorrect detection.

Figure 7A:
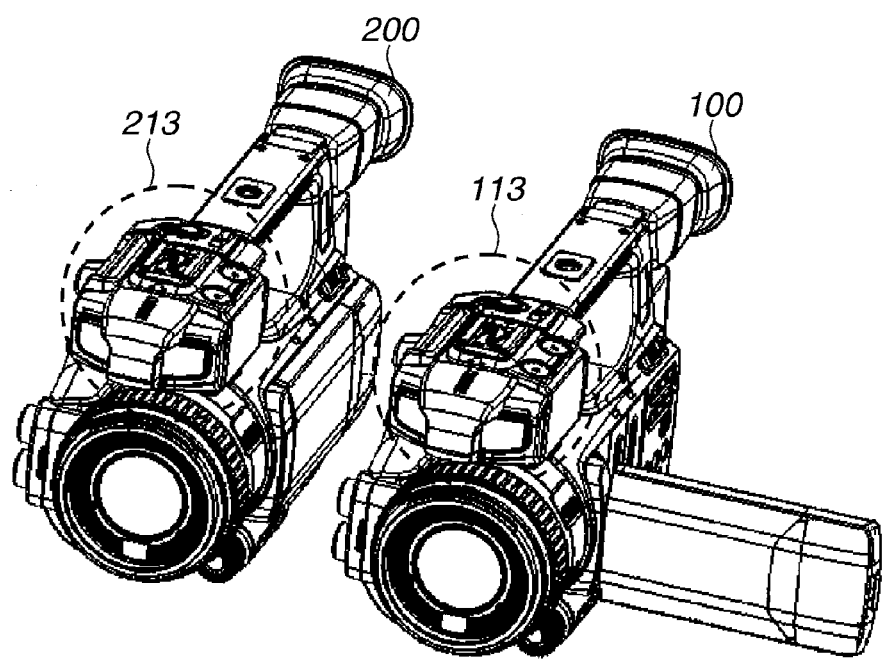
FIGS. 7A and 7B illustrate an entirety of a system and IR units at a time of synchronization shooting.
Figure 7B:
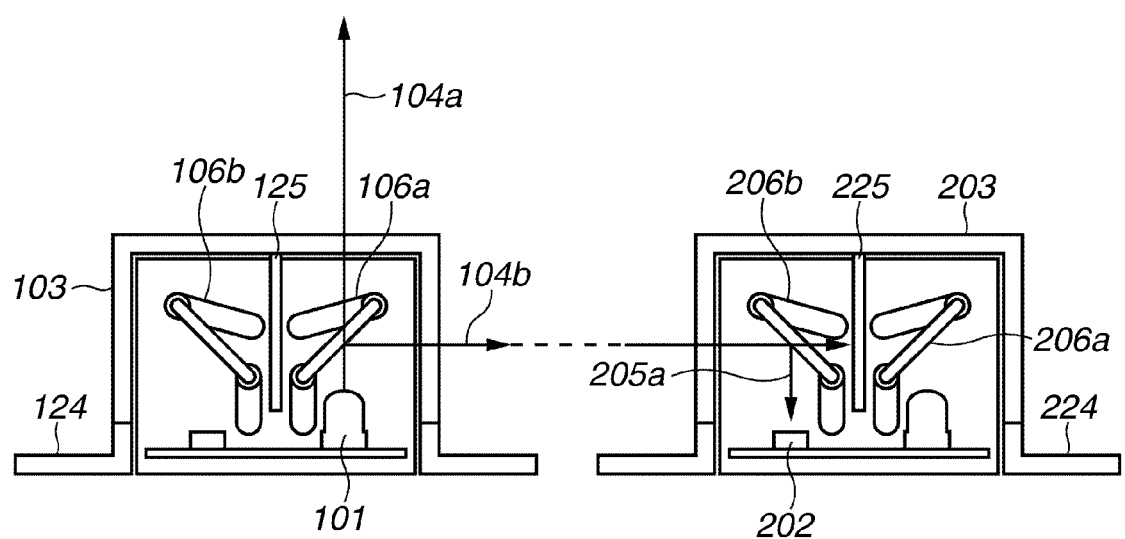
Figure 8A:
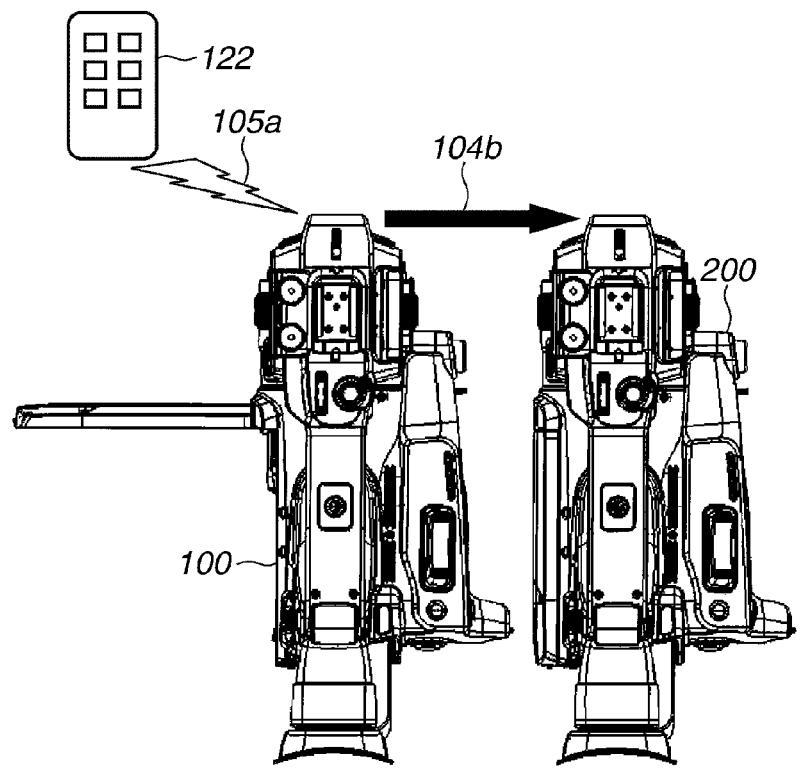
FIGS. 8A and 8B illustrate a remote control light receiving method at a time of synchronization shooting.
Figure 8B:
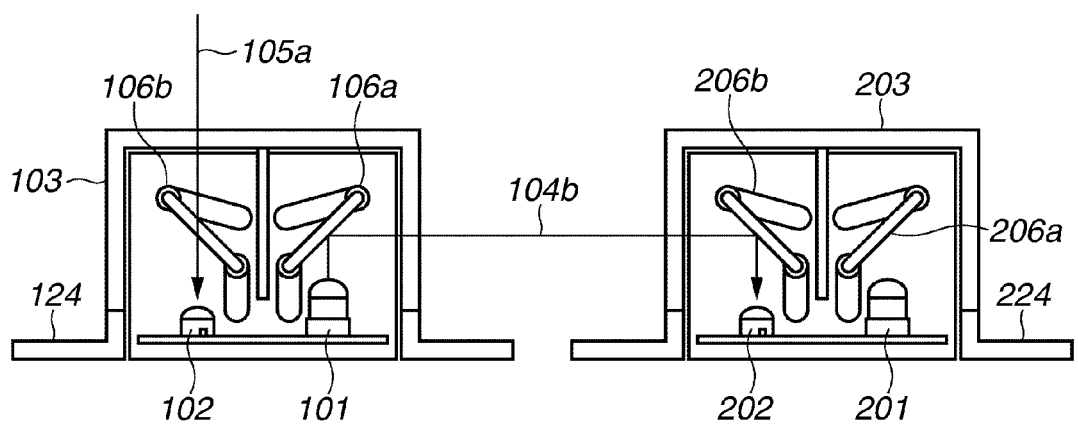
Figure 9A:
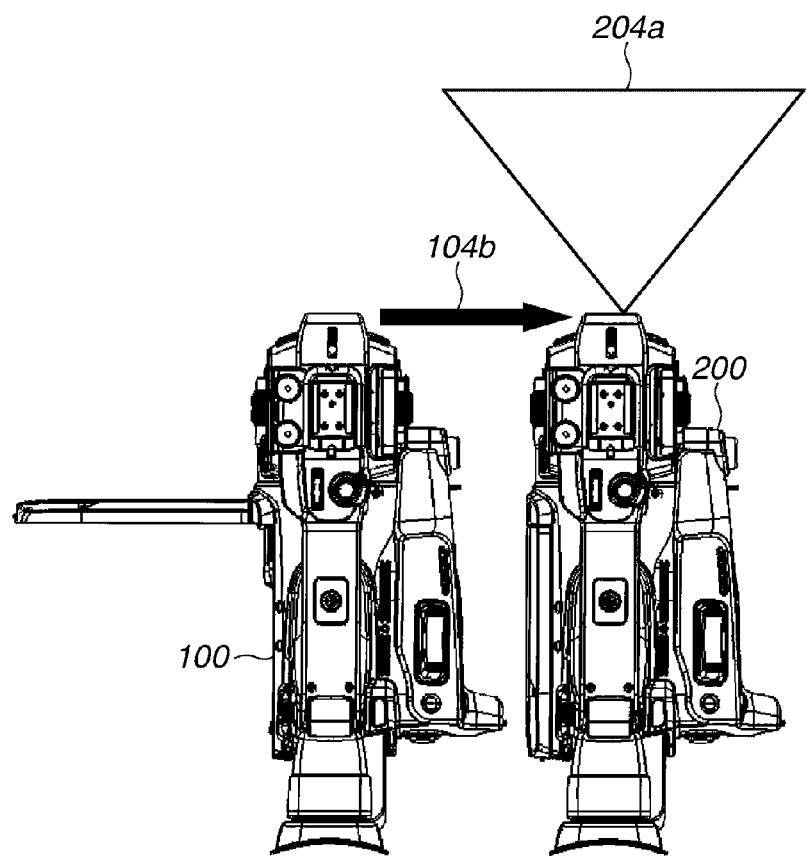
FIGS. 9A and 9B illustrate an emitting method of IR auxiliary light at a time of synchronization shooting.
Figure 9B:
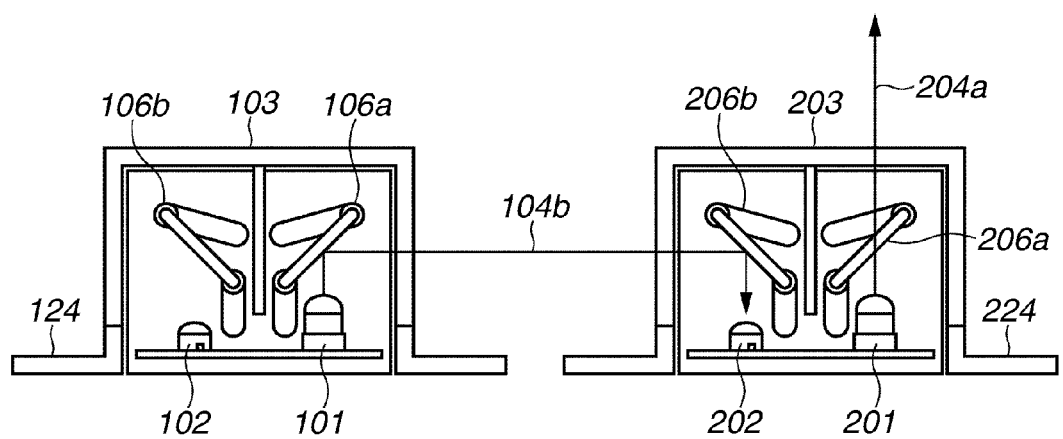

An entirety of the system according to the present exemplary embodiment at a time of synchronization shooting will be described with reference to FIG. 7 to FIG. 9. FIG. 7A is a perspective view illustrating the entirety of the system at the time of synchronization shooting. FIG. 7B is a schematic cross-sectional view illustrating the IR unit 113 at the time of synchronization shooting as viewed from an upper side. FIG. 8 and FIG. 9 illustrate states during the synchronization shooting. FIG. 8A and FIG. 9A illustrate the entirety of the system, and the FIG. 8B and FIG. 9B illustrate the inside of the IR unit 113.

In the system according to the present exemplary embodiment, at the time of synchronization shooting, two video cameras (preferably the same type of camera) are arranged in parallel, facing an object in the same orientation. In these video cameras, each IR unit 113 is placed side by side at an equal distance position from the object. In the following description, the left side camera in FIG. 8A is referred to as the left side camera 100 and the right side camera is referred to as the right side camera 200. The elements of the left side camera 100 have a number of one hundred series and the elements of the right side camera 200 have a number of two hundreds series. Here, when the last two digits in the number are the same, it indicates the same element. Further, both the left side camera 100 and the right side camera 200 are set to be in the synchronization shooting mode. In addition, the synchronization shooting system according to the present exemplary embodiment is configured to shoot a 3D image by the frame-sequential system.

FIG. 7B illustrates propagation of IR light at a time of synchronization shooting. In the video camera according to the present exemplary embodiment, the half-mirror 106a is arranged at the front side of the IR light emitting unit 101 of the left side camera 100. Therefore, as illustrated in FIG. 7B, the light flux 104 emitted from the IR light emitting unit 101 of the left side camera 100 is divided to two light fluxes at the half-mirror 106a, i.e., the light flux 104a which transmits through the half-mirror 106a to the front side and the light flux 104b which is reflected and guided to the right side. These light fluxes transmit through the window member 103 and go out from the video 100.

The light flux 104b, which is divided and guided to the right side, transmits through a window member 203 of the right side camera 200, is divided at a half-mirror 206b, and the light flux 205a is incident on an IR light receiving unit 202. At this time, since the light transmitting through the half-mirror 206b is blocked by the light blocking wall 225, the flux incident on the window member 203 enters only the IR light receiving unit 202. In the system according to the present exemplary embodiment, the synchronization at a time of shooting can be achieved by transmitting/receiving the synchronization signal using this IR.

Further, in the video camera 100 according to the present exemplary embodiment, the half-mirror 106 is arranged on the light paths 104 and 105. Thus, a part of the light fluxes 104 and 105 can transmits through the half-mirror 106 even at the time of the synchronization shooting mode. In other words, as illustrated in FIG. 8, by using the IR light receiving unit 102 of the left side camera 100, which is not used at the time of synchronization shooting, the IR light 105a emitted from the remote control system 122 can be received even at the time of synchronization shooting. Thus, the video camera 100 according to the present exemplary embodiment is user-friendly. At this time, the light flux reflected on the half-mirror 106b is blocked by the light blocking wall 125, so that the light flux incident on the window member 103 is incident on only the IR light receiving unit 102.

Similarly, as illustrated in FIG. 9, by using the IR light emitting unit 201 of the right side camera 200, which is not used at the time of synchronization shooting, the IR auxiliary light 204a can be projected to an object even at the time of synchronization shooting, so that the video camera 100 according to the present exemplary embodiment is user-friendly.

Figure 10:
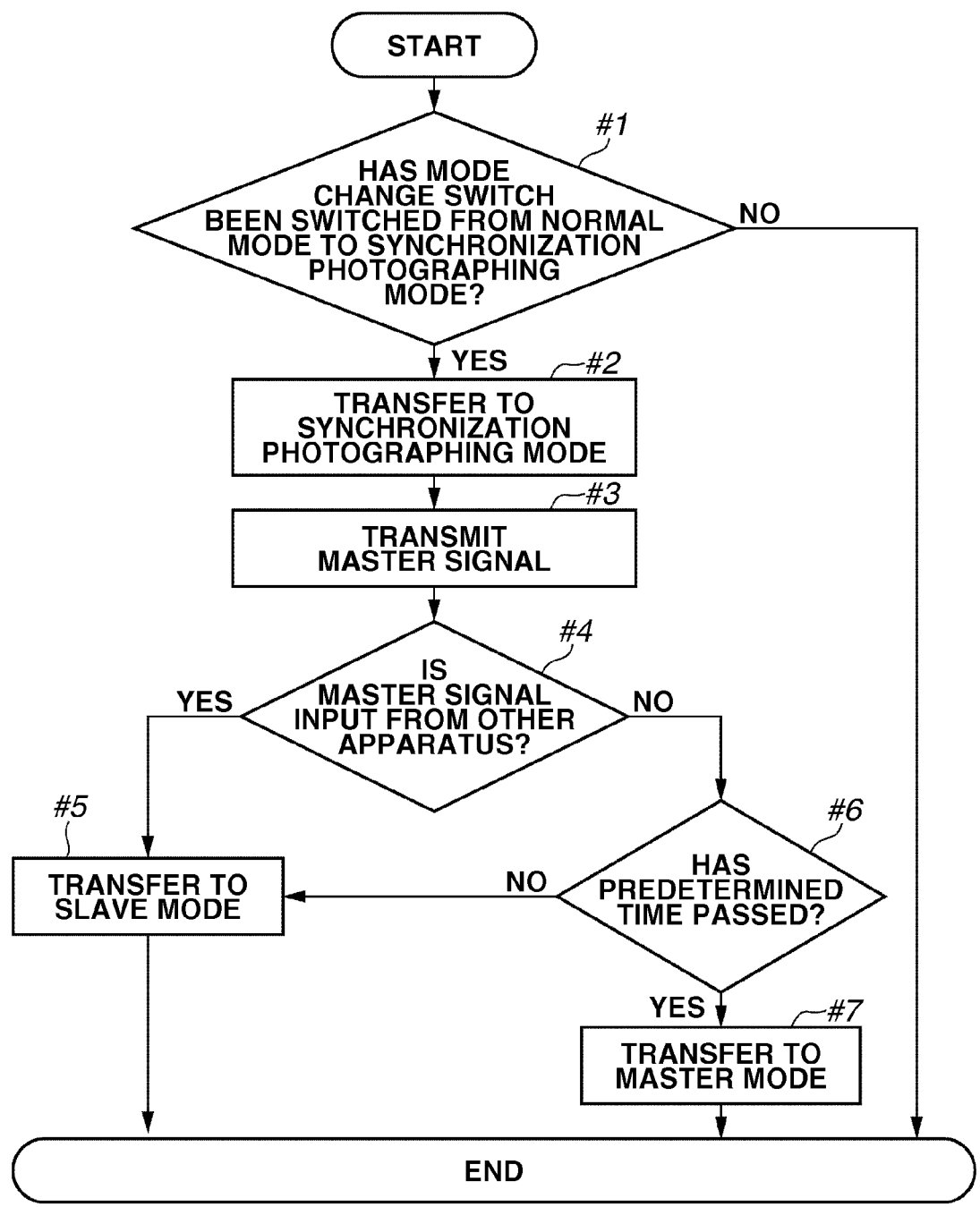
FIG. 10 is a flowchart when the apparatuses shift to a synchronization shooting mode.

Next, the operation of the video camera 100 according to the present exemplary embodiment when a shift operation to the synchronization shooting mode is performed, will be described with reference to FIG. 10. In FIG. 10 which is a flowchart for the shift operation to the synchronization shooting mode, the video camera starts from the normal mode.

In step #1, the system control unit 114 determines whether the mode change switch 107 is operated. When the system control unit 114 detects the operation of the mode change switch 107 (YES in step #1), in step #2, the system control unit 114 shifts the operation mode from the normal mode to the synchronization shooting mode. In step #3, after shifting to the synchronization shooting mode, the system control unit 114 transmits a master signal to the outside of the video camera 100 by predetermined flashing of the IR light emitting unit 101. In step #4, the system control unit 114 determines whether the master signal is input to the IR light receiving unit 102 from other video cameras. When the system control unit determines that the master signal is input (YES in step #4), in step #5, the system control unit 114 shifts the operation mode to a slave mode and designates itself to be a slave camera. When the system control unit 114 determines that the master signal is not input, the processing proceeds to #6.

When the system control unit 114 transmits the master signal in step #3, the timer 117 starts to count a time from the transmission. When the master signal from another video camera is not input during a predetermined time (YES in step #6), in step 7, the system control unit 114 shifts the operation mode to a master mode and designates itself to be a master camera.

Figure 11:
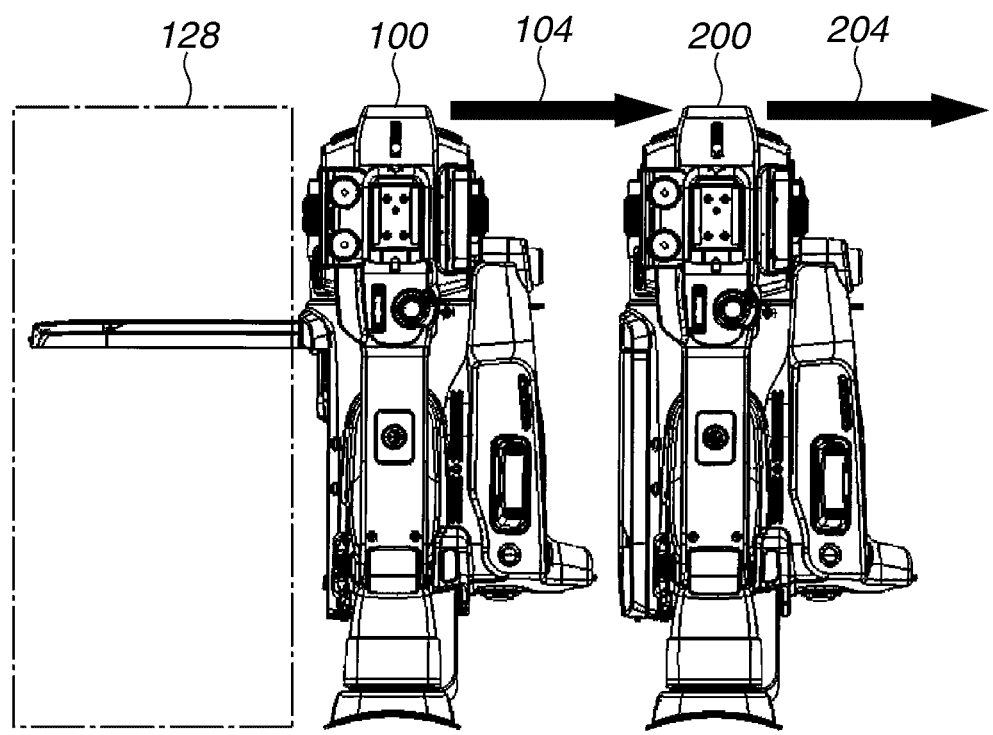
FIG. 11 is an upper face view illustrating an entirety of the system when the apparatus shifts to the synchronization shooting mode.

Next, the designated state of the master camera and the slave camera will be described with reference to FIG. 11. FIG. 11 is an upper face view illustrating an entirety of the system at a time of shifting to the synchronization shooting mode. In the present exemplary embodiment, the IR light emitting unit 101 of the left side camera 100 and the IR light receiving unit 202 of the right side camera 200 are opposing (opposite to) each other arranged at the side face of each camera. Therefore, as illustrated in FIG. 11, even if the both left and right cameras simultaneously transmit a master signal, the master signal transmitted from the right side camera 200 is not input to the left side camera 100 and only the master signal transmitted from left side camera 100 is input to the right side camera 200. Therefore, the left side camera 100 is surely designated to be the master camera and the right side camera 200 is designated to be the slave camera.

In this arrangement, a space 128 can be secured to the left side of the left camera 100, i.e., the side on which the display unit 110 and the operation unit 111 of the master camera are located. In the master camera side, various operations, such as confirmation of images during shooting and change or adjustment of setting at a time of shooting, are required. According to the present exemplary embodiment, since there is a space 128 in front of the display unit 110 and the operation unit 111, the operability is very high.

A processing flow of the master camera and the slave camera at a time of the synchronization shooting mode will be described with reference to the block diagram of FIG. 2. At first, the processing flow in the master camera side at a time of the synchronization shooting mode will be described. First, the synchronization signal processing unit 115 outputs a synchronization signal to the system control unit 114 and the IR light emitting unit 101. The output synchronization signal includes a horizontal synchronization (HD) signal and a vertical synchronization (VD) signal which are output to the IR light emitting unit 101. The VD signal, which is a start signal in the vertical direction of a screen, passes through a delay circuit 118 within the synchronization signal processing unit 115 and is output after a predetermined delay. This is because the data for a left eye and the data for a right eye are alternately displayed for each frame when images of the master camera and the slave camera are synthesized at a later time. The system control unit 114 controls the imaging unit 108 based on the synchronization signal output from the synchronization signal processing unit 115 and records the acquired image information in the recording unit 116.

Next, a processing flow on the slave camera side at a time of synchronization shooting mode will be described. Information transmitted from the master camera side via the IR light receiving unit 202 is input to a synchronization signal processing unit 215 in the slave side camera. The synchronization signal processing unit 215 outputs a predetermined synchronization signal corresponding to the input information, to a system control unit 214. The system control unit 214 controls an imaging unit 208 based on the synchronization signal output from the synchronization signal processing unit 215 and records the acquired image information in the recording unit 216.

As described above, in the present exemplary embodiment, the image pickup apparatus includes the IR light emitting unit 101 and the IR light receiving unit 102, divides light by a half-mirror, and provides the IR unit 113 at a top of a handle. The IR unit 113 covers the front face and the side face of the IR light emitting unit 101 and the IR light receiving unit 102 with the window member 103. By transmitting/receiving the synchronization signal in IR communication, the image pickup apparatus improves operability for a photographer at a time of synchronization shooting.

The present invention also provides (in which the reference numbers are exemplary and non-limiting) an image pickup apparatus (100) comprising:
a light emitting means (101) and a light receiving means (102);
a switching means (107) configured to switch between a normal mode for normally imaging and a synchronization shooting mode for performing synchronization shooting with another image pickup apparatus (100); and
a control means (114);
wherein the image pickup apparatus (100) can perform optical communication with another image pickup apparatus (100) and perform synchronization shooting,
wherein the light emitting means (101) and the light receiving means (102) are arranged in parallel and oriented toward a front direction of the apparatus to face an object,
wherein a first light path changing means is provided for the light emitting means (101), and a second light path changing means is provided for the light receiving means (102),
wherein, according to switching by the switching means (107), the control means (114) brings the first light path changing means into a first state in which a light flux from the light emitting means (101) can be guided toward a front direction of an apparatus when the apparatus is in the normal mode, and brings the first light path changing means into a second state in which a light flux from the light emitting means (101) can be guided toward a front direction and a side direction of an apparatus when an apparatus is in the synchronization shooting mode, and
wherein, according to switching by the switching means (107), the control means (114) brings the second light path changing means into a first state in which a light flux from a front direction of an apparatus can be guided to the light receiving means (102) when an apparatus is in the normal mode, and brings the second light path changing means into a second state in which fluxes from a front direction and a side direction of an apparatus can be guided to the light receiving means (102) when an apparatus is in the synchronization shooting mode.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-007590 filed Jan. 18, 2011, which is hereby incorporated by reference herein in its entirety.

What is claimed is:
1. An image pickup apparatus comprising:
a light emitting unit and a light receiving unit,
wherein the light emitting unit and the light receiving unit are arranged in parallel and oriented toward a front direction of the image pickup apparatus to face an object, of which an image is to be picked up;
a first light path changing unit; and
a second light path changing unit,
wherein the first light path changing unit is movable from a first state, in which a light flux from the light emitting unit is guided toward a front direction of the image pickup apparatus, into a second state in which the light flux from the light emitting unit is divided into a first and second light flux, the first light flux is guided toward a front direction of the image pickup apparatus, and the second light flux is guided toward a side direction of the image pickup apparatus, and
wherein the second light path changing unit is movable from a first state, in which a light flux from a front direction of the image pickup apparatus is guided to the light receiving unit, into a second state in which light fluxes from a front direction and a side direction of the image pickup apparatus are guided to the light receiving unit.

2. The image pickup apparatus according to claim 1,
wherein the image pickup apparatus is operable in a normal mode for performing normal imaging and a synchronization shooting mode for performing synchronized shooting with another image pickup apparatus, and further comprising a switching unit configured to switch between the normal mode and the synchronization shooting mode, wherein the first and second light path changing units are arranged to move between the first and second states in accordance with the mode selected by the switching means unit.

3. The image pickup apparatus according to claim 2, wherein the first and second light path changing units are arranged to move to their respective first states when the switching unit switches to the normal mode and to move to their respective second states when the switching unit switches to the synchronization shooting mode.

4. The image pickup apparatus according to claim 2, wherein the image pickup apparatus is arranged to perform optical communication with the other image pickup apparatus in the synchronization shooting mode.

5. The image pickup apparatus according to claim 1, further comprising:
a window member configured to cover a front and a side of the light emitting unit and the light receiving unit.

6. The image pickup apparatus according to claim 5,
wherein the apparatus comprises an imaging optical system and the window member is located at the front of a protruding portion provided on an upper side of the imaging optical system.

7. The image pickup apparatus according to claim 1,
wherein the first light path changing unit and the second light path changing unit each comprise a beam splitter which is a light path dividing unit.

8. The image pickup apparatus according to claim 7,
wherein the beam splitter takes a position retracting from a light path of the light flux in the first state, and takes a position arranged at a predetermined angle relative to a light axis of the light flux in the second state.

9. The image pickup apparatus according to claim 1,
wherein the apparatus comprises a grip unit and wherein the light emitting unit is located at a grip unit side and the light receiving unit is located at an opposite side to the grip unit.

10. The image pickup apparatus according to claim 1,
wherein the light emitting unit is an infrared light emitting unit and the light receiving unit is an infrared light receiving unit.

* * * * *